(12) United States Patent
Balassanian et al.

(10) Patent No.: US 12,322,363 B2
(45) Date of Patent: Jun. 3, 2025

(54) TECHNIQUES FOR GENERATING MUSICAL PLAN BASED ON BOTH EXPLICIT USER PARAMETER ADJUSTMENTS AND AUTOMATED PARAMETER ADJUSTMENTS BASED ON CONVERSATIONAL INTERFACE

(71) Applicant: AiMi Inc., Littleton, CO (US)

(72) Inventors: Edward Balassanian, Austin, TX (US); Andrew C. Sorensen, Launceston (AU); Patrick E. Hutchings, Melbourne (AU)

(73) Assignee: AiMi Inc., Littleton, CO (US)

( * ) Notice: Subject to any disclaimer, the term of this patent is extended or adjusted under 35 U.S.C. 154(b) by 0 days.

(21) Appl. No.: 18/817,787

(22) Filed: Aug. 28, 2024

(65) Prior Publication Data

US 2025/0078790 A1    Mar. 6, 2025

Related U.S. Application Data

(60) Provisional application No. 63/640,705, filed on Apr. 30, 2024, provisional application No. 63/579,859, filed on Aug. 31, 2023.

(51) Int. Cl.
*G10H 1/00* (2006.01)
*G06F 40/20* (2020.01)

(52) U.S. Cl.
CPC .......... *G10H 1/0025* (2013.01); *G06F 40/20* (2020.01)

(58) Field of Classification Search
CPC .............................. G10H 1/0025; G06F 40/20
USPC ........................................................ 84/609
See application file for complete search history.

(56) References Cited

U.S. PATENT DOCUMENTS

| 8,812,144 B2 * | 8/2014 | Balassanian .......... G06F 16/683 |
| | | 381/119 |
| 10,679,596 B2 * | 6/2020 | Balassanian ........... G06N 5/025 |
| 2018/0032611 A1 * | 2/2018 | Cameron .............. G06F 16/685 |
| 2018/0190249 A1 * | 7/2018 | Roblek ................ G10H 1/0025 |
| 2021/0312897 A1 * | 10/2021 | Ackerman ........... G11B 27/031 |
| 2022/0223125 A1 * | 7/2022 | Zhou ...................... G06F 40/30 |

(Continued)

FOREIGN PATENT DOCUMENTS

| CN | 113838445 B * | 2/2022 |
| WO | WO-2021159203 A1 * | 8/2021 |

OTHER PUBLICATIONS

U.S. Appl. No. 18/585,754, filed Feb. 23, 2024.
International Search Report and Written Opinion in PCT Appl. No. PCT/US2024/044169 mailed Dec. 10, 2024, 9 pages.

*Primary Examiner* — Christina M Schreiber
(74) *Attorney, Agent, or Firm* — Kowert, Hood, Munyon, Rankin & Goetzel, P.C.; Michael B. Davis; Dean M. Munyon

(57) ABSTRACT

Disclosed techniques relate to user control of generative music. In some embodiments, a computing system generates a musical plan based on both conversational inputs (e.g., using a large-language model (LLM)) and non-conversational inputs (e.g., via a traditional user interface) to a hybrid interface. The computing system may generate an initial version of the musical plan based on the LLM context and update the context and plan based on various types of user input via the hybrid interface. Disclosed techniques may advantageously allow guided user control over generative music systems.

20 Claims, 13 Drawing Sheets

(56) References Cited

U.S. PATENT DOCUMENTS

| | | | |
|---|---|---|---|
| 2023/0274086 A1* | 8/2023 | Tunstall-Pedoe | G06F 40/20 704/9 |
| 2024/0169974 A1* | 5/2024 | Bonar | G10L 13/10 |
| 2024/0203387 A1* | 6/2024 | Belikov | G06F 40/40 |
| 2024/0346254 A1* | 10/2024 | Liu | G06F 40/40 |
| 2024/0354515 A1* | 10/2024 | Bouguerra | H04L 51/216 |
| 2024/0395233 A1* | 11/2024 | Roberts | G10L 15/063 |

* cited by examiner

```
1  {
2    "title": "The Plan",
3    "type": "object",
4    "description": "A plan for generating musical content",
5    "properties": {
6      "verse": {
7        "type": "object",
8        "properties": {
9          "description": {
10           "type": "string"
11         },
12         "beats": {
13           "type": "number"
14         },
15         "bpm": {
16           "type": "number"
17         },
18         "key": {
19           "type": "string"
20         }
21       },
22       "required": [
23         "beats",
24         "BPM",
25         "key"
26       ]
27     }
28   }
29 }
```

TECHNIQUES FOR GENERATING MUSICAL PLAN BASED ON BOTH EXPLICIT USER PARAMETER ADJUSTMENTS AND AUTOMATED PARAMETER ADJUSTMENTS BASED ON CONVERSATIONAL INTERFACE

CROSS REFERENCE TO RELATED APPLICATIONS

The present application claims priority to U.S. Provisional App. No. 63/579,859, entitled "SongMaker," filed Aug. 31, 2023 and U.S. Provisional App. No. 63/640,705, entitled "Video Extension for SongMaker," filed Apr. 30, 2024. The disclosures of each of the above-referenced applications are incorporated by reference herein in their entireties.

BACKGROUND

Technical Field

This disclosure relates to audio engineering and more particularly to generating a plan for a musical composition using a hybrid user interface.

Description of Related Art

Generative music systems may use computers to compose music, with limited or no user input to the composition process. Artificial intelligence (AI) has made significant advancements in various fields, including generative music. AI-based music generators may leverage various algorithms and machine learning techniques to process and output musical content. AI music generators may be trained on large datasets of music to understand the structure, style, and features of various musical genres in order to generate new musical content. AI music technology can further be used in a variety of applications from assisting composers and musicians to creating soundtracks for films and video games. Traditional generative systems, however, may not provide efficient mechanisms for user interaction or input to the composition process.

BRIEF DESCRIPTION OF DRAWINGS

FIG. 4 is a diagram illustrating an example plan schema used to generate the musical plan, according to some embodiments.

FIG. 7-12 show an example hybrid user interface configured to generate a musical plan based on video data, according to some embodiments.

DETAILED DESCRIPTION

Figure 1:
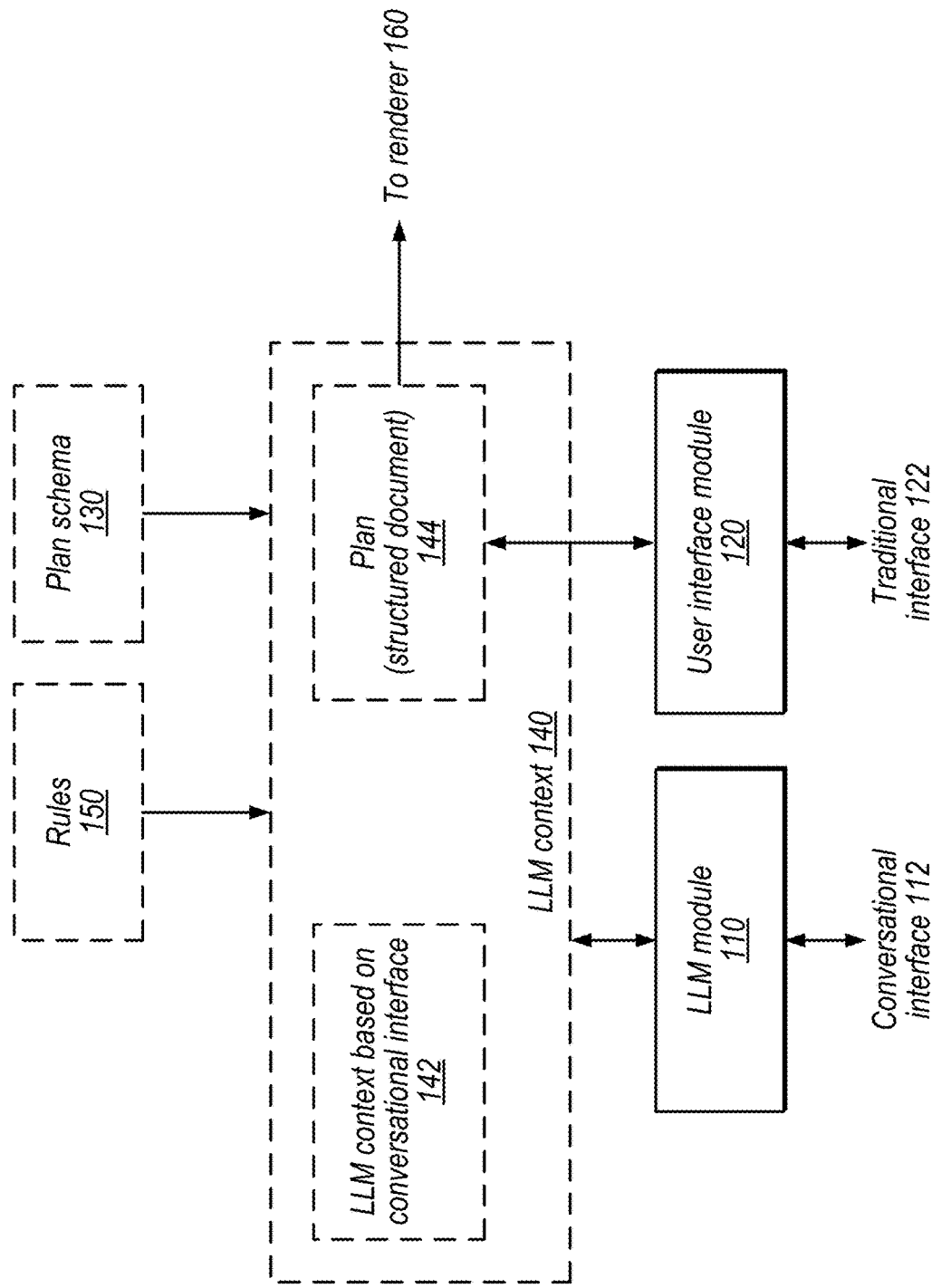
FIG. 1 is a block diagram illustrating a system configured with a hybrid user interface to generate a musical plan based on user inputs from a conversational interface and a traditional interface, according to some embodiments.

Disclosed computing systems provide a hybrid user interface to facilitate user control of generative music, e.g., incorporating both traditional and conversational inputs to generate a musical plan. The hybrid interface may facilitate use by a wide variety of users, e.g., allowing AI input to initiate the plan and provide guidance where users lack expertise, while allowing detailed user input for other parameters.

Computer systems generally implement different types of user interfaces (UI) to facilitate the interaction between the computer system and a user. A UI can be a graphical user interface (GUI), command line interface (CLI), touchscreen interface, natural language UI, etc. In particular, a GUI is a digital interface that allows a user to interact with a system via graphical elements. These graphical elements can include icons, buttons, pull-down menus, scroll bars, etc. that visually represent information which can be manipulated by a user.

A music composition tool may provide a user interface that allows users to modify various parameters as part of generating musical content. Although GUIs are designed to be visually intuitive, GUIs can often be challenging for users that are unfamiliar with the particular domain associated with a software application. For example, a user that is unfamiliar with musical terminology may struggle to navigate the GUI of music production software and may lack expertise in certain parameters even if they understand the interface.

A natural language UI (NLUI) is a digital user interface that allows a user to interact with a computer system using natural human language. A NLUI may also be referred to herein as a conversational interface. For example, a NLUI may utilize a large language model (LLM) to process user inputs to generate relevant outputs. User inputs may be verbal or text-based, for example. Although NLUIs are designed to be more accessible (as if communicating with another user), NLUIs may not provide the precise customizability desired by experienced users when interacting with a software application. Because GUIs may not be intuitive for users lacking expertise and NLUIs may not provide the customizability of a GUI, it may be desirable to implement a system configured with both a NLUI and a GUI that is adaptive and responsive to users of varying levels of experience.

In some embodiments, a system implements a hybrid user interface that allows users to generate a musical plan based on both conversational inputs (e.g., using a large language model (LLM)) and traditional user interface inputs (e.g., buttons, sliders, drop-down menus, etc.). The musical plan may be a JSON file, for example, in a format recognized by the AiMi music operating system (AMOS) for rendering into a musical composition. For example, the system may utilize various techniques described in U.S. Pat. Nos. 8,812,144 and 10,679,596 to compose or "render" music based on the plan. In some embodiments, the system also provides a video extension, e.g., to use the interface to generate music for a particular video. In these embodiments, the videos may be analyzed to determine various context information for the conversational side of the user interface (e.g., to pre-populate a musical plan or update an existing plan).

This may have several advantages, at least in some embodiments. First, in certain scenarios, it may be desirable for a user to generate a musical plan for rendering musical content without requiring musical expertise from the user. For example, a user may describe their intent for creating an R&B song to the LLM, and based on the context of the conversation, the LLM can generate a musical plan for rendering an R&B song. As a second advantage, the values of the musical plan that are generated by the LLM, such as beats per minute, can be represented visually and manipulated through the GUI. For example, an LLM may populate the musical plan with an initial set of values based on the context of the conversation, and the user may modify those values using the GUI. As a third advantage, updates to the musical plan using the GUI may be incorporated into the context of the LLM to influence its outputs. For example, a user may modify the structure of the musical plan using the GUI, and accordingly, the LLM may generate a conversational output in which it recommends additional changes or provides automatic updates to other parts of the plan.

Overview of Hybrid Interface

FIG. 1 is a block diagram illustrating an example of a hybrid interface configured to generate a musical plan, according to some embodiments. In the illustrated example, the system implements LLM module 110 and user interface module 120. The system also stores data for a plan schema 130, LLM context 140 (which in turn includes plan 144 and LLM context 142 that is based on text from the conversational interface), and rules 150. Various disclosed modules may be controlled by a control module (not explicitly shown), e.g., that receives user input, provides prompts to the LLM module 110, accesses data such as the schema 130, etc.

The illustrated modules, in various embodiments, implement software executable to generate plan 144 based on conversational inputs (e.g., using a large language model (LLM)) and/or traditional user interface inputs (e.g., buttons, sliders, drop-down menus, etc.). Plan 144, in various embodiments, is a structured document (e.g., JSON, XML, etc.) that is sent to renderer 160 to generate music content. Renderer 160 may be one or more machine learning models, script-based models, and/or algorithms configured to process plan 144 and output audio data. Plan 144 may specify musical attributes at a high level, e.g., in terms of sections, tempo, and key, but renderer 160 may output lower-level composition decisions such as arranging loops within a section, selecting instruments, etc. based on plan 144. For example, plan 144 may describe the structure and genre for a desired song, and renderer 160 may output a fully mastered audio file that comports with plan 144. The split between composition decisions specified by plan 144 and decisions made by renderer 160 may vary, in different embodiments. For example, in some embodiments, plan 144 may provide more detailed instructions to renderer 160, e.g., to specify specific loop parameters for use in generating the music content.

Renderer 160, in some embodiments, constructs compositions from loops available in a loop library. Renderer 160 may receive the musical plan and access loops, loop metadata, environment information, user feedback, etc. to generate a musical composition. In some embodiments, the renderer 160 outputs a performance script that is sent to a performance module. The performance script, in some embodiments, outlines which loops will be played on each track of the generated stream and what effects will be applied to the stream. The performance script may utilize beat-relative timing to represent when events occur. The performance script may also encode effect parameters (e.g., for effects such as reverb, delay, compression, equalization, etc.). The performance module may master an output music track based on the performance script.

LLM module 110 may generate an initial plan 144 based on plan schema 130 (which may be provided to LLM module 110 as initial context information) and/or manually by user input received via user interface module 120. Plan schema 130, in various embodiments, defines the structure, organization, and constraints of plan 144 and may include metadata (e.g., name, descriptions, timestamps, version, etc.), a default song structure (e.g., 32-bar form), set of input fields with default values, etc. In some embodiments, a particular plan schema 130 may be selected from a plurality of stored schemas 130 based on conversational user input via conversation interface 112. For example, a user may request a particular genre, such as drum and bass, and LLM module 110 may select a corresponding plan schema 130 (and may also populate the plan 144, according to the schema, with a set of default values for bass, rhythm, beats per minute, etc.). An example schema is discussed in greater detail with respect to FIG. 4. After the initial plan 144 is generated, it may be modified via hybrid interface. Although not shown in FIG. 5, note that the plan schema 130 and the rules 150 may also be retained in the LLM context 140.

In the illustrated example, a user may modify plan 144 via both a traditional interface 122 implemented by user interface module 120 (e.g., to add sections, adjust section parameters, etc.) and a conversational interface 112 via LLM module 110 (which may automatically update the plan based on user questions or instructions). LLM module 110, in various embodiments, uses one or more neural networks (e.g., transformer) to process conversational inputs provided by a user via conversational interface 112. A conversational input may include one or more questions, commands, and/or statements that are text-based and/or voice-based. For example, a user may input a textual description that describes parameters and desires for music to be composed. Based on the context of the conversational input, LLM module 110 may generate a response, generate plan 144, and/or modify plan 144. For example, LLM module 110 may process a textual question provided by a user and generate a textual response based on the context of the question and plan 144. LLM module 110 may use an off-the-shelf model that may adjust its responses based on LLM context 140 and/or may include one or more models trained specifically to generate musical plans (e.g., based on training data sets with sample contexts and corresponding musical plans 144).

LLM context 140, in various embodiments, is metadata that describes the circumstances in which a particular LLM input is received, such as metadata associated with earlier received inputs into LLM module 110. Context 140 may include various information understood by those of skill in the art for LLMs. As shown, LLM context 140 includes context based on the conversational interface 112 (e.g., user queries or instructions, responses by the LLM module, etc.) and plan 144. For example, LLM module 110 may suggest or implement a set of adjustments to plan 144 based on previous queries about pop music. The LLM context 140 may be updated with additional information using various techniques. For example, the LLM itself may track a context window that may incorporate multiple user interactions via the conversational interface 112, multiple versions of the plan 144, etc. In other embodiments, a control module may handle iterative updates to the context 140, e.g., by appending new information to the context based on user input or outputs of LLM module 140, replacing certain parts of the context with revised text, etc.

In various embodiments, context 140 may also include additional categories of information, such as video-based context. For example, LLM module 110 may receive a textual description that describes a scene in a video, and LLM module 110 may consider the description when responding to a user query via the conversational interface 112. Video-based context is described in greater detail with respect to FIG. 5. In various embodiments, the system may store multiple versions of plan 144 in LLM context 140, although only the current version may be eligible for sending to the renderer 160. For example, differentials between old plans 144 and the latest plan 144 may be maintained in the context 140. In other embodiments, only the latest plan may be stored in context 140.

User interface module 120, in various embodiments, is software executable to provide traditional interface(s) 122 to facilitate the interaction between a user and plan 144. Traditional interface 122 may include buttons, sliders, icons, menus, toolbars, dropdown lists, checkboxes, text fields, etc. For example, a user may adjust the beats per minute for plan 144 by adjusting the position of a slider, entering a numeric value in a text field, etc. In some embodiments, manual user updates to plan 144, via traditional interface 122, automatically update the LLM context 140, and updates to the plan 144 by LLM module 110 may be reflected via the user interface as well. Further, in response to a user interacting with traditional interface 122, user interface module 120 may generate a textual description that describes the user's interaction and provide the textual description to LLM context 140. For example, user interface module 120 may generate a textual description that describes a key change (e.g., C major to A major) for plan 144, via the traditional interface 122, and provide that description to LLM context 140. As a result, LLM module 110 may process this textual description as part of responding to additional conversational user input. In other embodiments, LLM module 110 may incorporate user interactions via module 120 only based on changes to plan 144.

Rules 150 may be prompts for LLM module 110 and may instruct the LLM module 110. For example, rules 150 may be text that instruct the LLM module 110 to act as a music composition assistant for the user, to generate a plan 144 that complies with the format of an existing plan 144 or the schema 130, etc. Note that LLM module 110 may generally generate two types of outputs (both of which may be added to context 140), and it may select between the two based on rules 150. First, LLM module 110 may generate responses to user queries. For example, a user query "tell me about the history of Reggae" may typically result in a text response. Second, LLM module 110 may generate a new or updated plan 144. For example, a user query "please compose a Reggae song" may typically result in a response with a new or updated plan 144, which may become the current version that is eligible to be sent to the renderer 160. LLM module 110 may have full discretion over which type of output to generate. The rules 150 may impact this decision, e.g., by stating that "if the user mentions generating or composing music, they mean that you should generate or update the structured plan document."

Disclosed techniques may advantageously facilitate user creation of a musical plan by allowing suggestions (e.g., via the conversational interface 112) to guide the user while still providing traditional user interface 122 elements for more specific control (and using those traditional inputs to further guide conversational suggestions).

Figure 2:
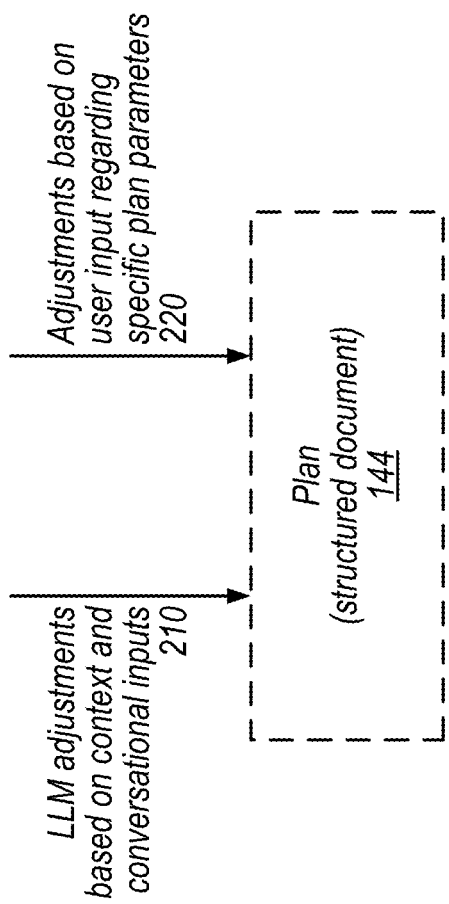
FIG. 2 is a detailed block diagram illustrating modifying the musical plan based on adjustments received via the conversational interface and the traditional interface, according to some embodiments.

FIG. 2 is a block diagram illustrating an example of modifying plan 144 based on different types of user input. In the illustrated example, plan 144 is modified based on LLM adjustments based on context and conversational inputs 210 and adjustments based on user input regarding specific plan parameters 220.

In the illustrated example, both LLM adjustments based on context and conversational inputs 210 and adjustments based on user input regarding specific plan parameters 220 are used to modify plan 144. LLM module 110, in various embodiments, processes conversational inputs provided by a user, via conversational interface 112, and outputs LLM adjustments 210 based on the context of the conversational input. LLM adjustments 210 may include adjusting the structure (e.g., adding sections), adjusting values associated with musical attributes (e.g., changing key), adjusting section descriptions, etc. For example, a user may instruct LLM module 110 to add an additional verse section to plan 144, and based on this request, LLM module 110 may insert a section labeled verse into plan 144. In some embodiments, LLM module 110 may generate LLM adjustments 210 after a series of exchanges between the user and LLM module 110. For example, after inserting the additional section into plan 144, LLM module 110 may adjust the musical attributes of the new section (without specifically being prompted by the user) based on prior adjustments to existing verse sections.

In the illustrated example, adjustments 220 are used to modify plan 144 based on user input via user interface module 120. The structure and/or parameters of plan 144 may be adjusted using buttons, sliders, drop down menus, toggles, checkboxes, text inputs, checkboxes, etc. For example, a user may adjust the structure of plan 144 by clicking and dragging a box that represents a section of plan 144 to a different position. In various embodiments, LLM module 110 is configured to adjust one or more settings that are accessible to a user via the traditional interface 122. For example, a user may ask LLM module 110 to adjust a particular value for the beats per minute in lieu of manually interacting with traditional interface 122. Accordingly, the one or more adjustments 210 implemented by LLM module 110 may be visible to the user via the traditional interface 122. For example, a slider in the traditional interface 122 may be repositioned to reflect the value associated with LLM adjustments 210.

Figure 3:
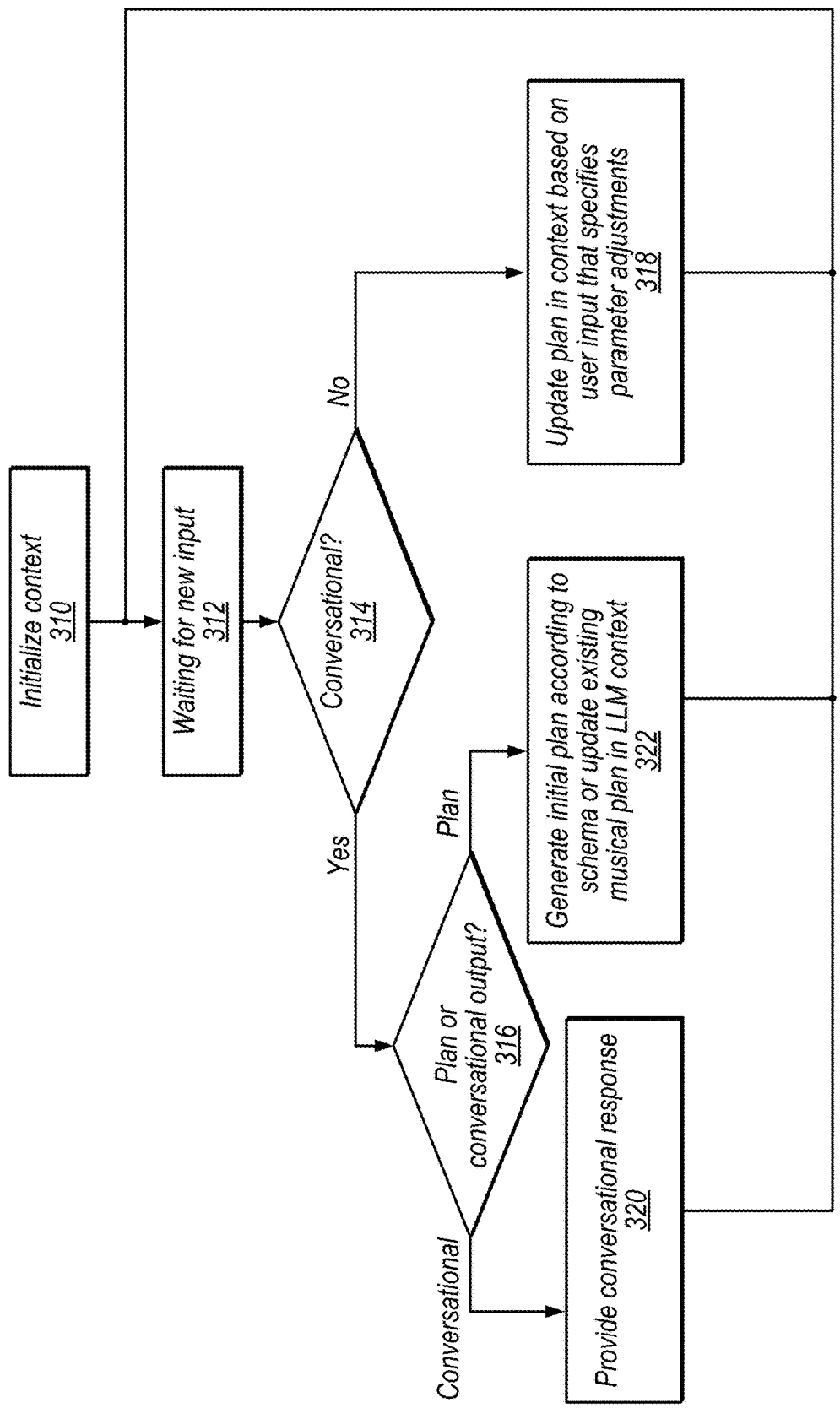
FIG. 3 is a flow diagram illustrating an example flow for a user interaction with the hybrid user interface, according to some embodiments.

FIG. 3 is a flow diagram illustrating an example process for generating and/or modifying a musical plan using a hybrid interface, according to some embodiments. In the illustrated example, the context for LLM module 110 is initialized at 310. In some embodiments, the context initialization includes adding rules 150 and schema 130. At 312, the hybrid interface remains in an idle state until user input is received. In various embodiments, the hybrid interface may respond to an initial prompt provided by the user, at 310, prior to entering into an idle state. For example, LLM module 110 may output a textual response that acknowledges the user's initial prompt prior to entering an idle state at 312.

At 314, the system has received user input via the hybrid interface, e.g., via the conversational interface 112 or the traditional interface 122. If user input is received via conversational interface 112, flow proceeds to 316 and the LLM module 110 processes the input. At 316, if the LLM module 110 determines that the input merits a conversational output, flow proceeds to 320 and LLM module 110 provides a conversational response. For example, the user may submit a query about a musical artist to LLM module 110 using conversational interface 112, and based on the context of the query, the LLM module 110 may generate a textual response.

If the input merits a plan output at 316, flow proceeds to 322 and LLM module 110 either generates an initial plan (according to the schema) or updates an existing plan in the LLM context. For example, a user may instruct LLM module 110 to create an R&B song, and based on the context of the input, LLM module 110 may generate an initial plan 144, using plan schema 130, that represents an R&B song. The LLM model may determine whether a given input should have a plan output or a conversational output based on rules 150, for example. Generally, the LLM model may categorize the user input and determine whether the category merits a conversational or plan-based response. In some embodiments, the LLM model 110 may provide only one type of output (conversational or plan update) in response to a given user input. In other embodiments, LLM module 110 may provide both types of output for certain user inputs.

At 314, if the input was not conversational, flow proceeds to 318 and user interface module 120 updates plan 144 in LLM context 140 based on the user input that specifies parameter adjustments at 318. Note that this update also changes the context of the LLM module 110 for future interactions.

After performing an action in element 318, 320, 322, flow returns to 312 and the system waits for a new user input.

Note that at some point (not shown) the user may further interact with hybrid interface to indicate a desire to send the current plan 144 to renderer 160. For example, a user may click a button, via traditional interface 122, labeled "produce" to send the current plan 144 to renderer 160 or may provide a conversational input indicating a desire to produce.

Example Schema

FIG. 4 illustrates an example schema for a musical plan, according to some embodiments. In the illustrated example, plan schema 130 includes key-value pairs which define the structure, data fields, data types (e.g., strings, numbers, arrays, etc.), constraints, metadata, etc. of plan 144. Plan schema 130 may be used to constrain or validate the data provided by LLM module 110 and/or a user using user interface module 120. Plan schema 130 may have various different formats, attributes, organization, etc. in different embodiments. For example, plan schema 130 may include a fewer or greater number of key-value pairs than depicted in the illustrated embodiment. For example, plan schema 130 may include additional objects labeled "intro" and "chorus" that each contain a set of nested objects, such as "bass" and "rhythm," with their own set of properties.

Note that while the illustrated schema is similar to a JSON structure, it is included for purposes of illustration and may not necessarily have proper syntax for any particular schema-based language.

In the illustrated example, lines 2-4 include metadata that describe the intent of plan schema 130. As shown, plan schema 130 is titled "the plan" with a description that describes the intent of plan 144 as "a plan for generating musical content." At lines 6-21, plan schema 130 specifies an object labeled "verse" that includes a set of keys labeled as "description," "beats," "beats per minute (bpm)," and "key." Plan schema 130 defines the data type for each key (e.g., date field) using the "type" keyword. For example, plan schema 130 defines "beats" as an integer, and the value for the "beats" data field must satisfy this constraint. Default values may be defined by plan schema 144 and/or populated by LLM module 110 or user interface module 120 according to the schema. In the illustrated embodiment, plan schema 130 includes a "required" keyword that specifies a list of properties that are required to validate plan 144. For example, if the value for "key" is required and is missing, the validation of plan 144 fails.

Example Video Analysis Techniques for Hybrid Interface

Figure 5:
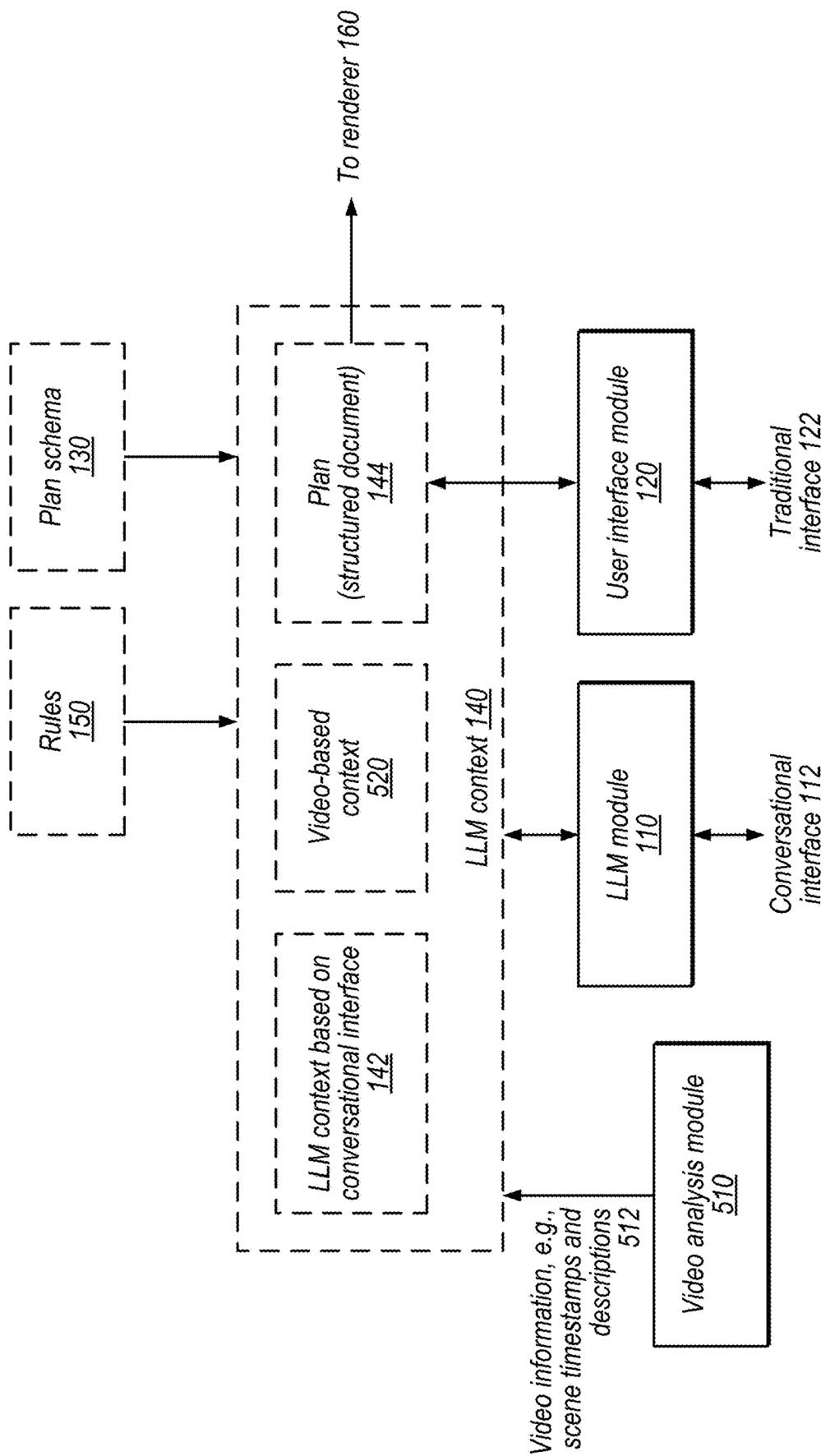
FIG. 5 is a block diagram illustrating a system configured with a hybrid user interface to generate the musical plan based on user inputs from a conversational interface, traditional interface, and a video analysis module, according to some embodiments.

FIG. 5 is a block diagram illustrating an example system with a hybrid interface that implements a video analysis module, according to some embodiments. In the illustrated example, LLM context 140 includes video-based context 520 based on video information 512 provided by video analysis module 510. Disclosed techniques may allow the system to pre-populate or revise various aspects of plan 144 based on attributes of a video.

In the illustrated example, video analysis module 510 is software executable to provide video information 512 (e.g., scene timestamps and scene descriptions) to LLM module 110. For example, video analysis module 510 may analyze video data and output one or more textual descriptions that describe the atmosphere, objects, characters, actions, etc. from a video. LLM module 110 may incorporate video information 512 into LLM context 140 (e.g., by adding the scene descriptions to context 520, using the timestamps to update section timing in the plan 144, generating a summary of the entire video and adding the summary to context 246, etc.). Note that video-based context 520 may also be organized as a JSON or XML document, for example. Because video-based context 520 is integrated in LLM context 140, LLM module 110 may utilize context 520 to facilitate one or more pertinent responses and/or LLM adjustments 210 to plan 144. For example, LLM module 110 may generate LLM adjustments 210 to plan 144 based on an action scene described from video information 512. In particular, LLM module 110 may adjust plan 144 such that it is interpretable by renderer 160 to generate musical content, such as orchestral score, appropriate for the action scene. Video analysis module 510 is discussed in greater detail with respect to FIG. 6.

Note that various video analysis parameters are discussed herein and used to update the LLM context, mapped to elements of a musical plan, etc. These parameters are included for the purpose of illustration but are not intended to limit the scope of the present disclosure. Other parameters are contemplated as well as other mappings/uses of disclosed parameters.

Figure 6:
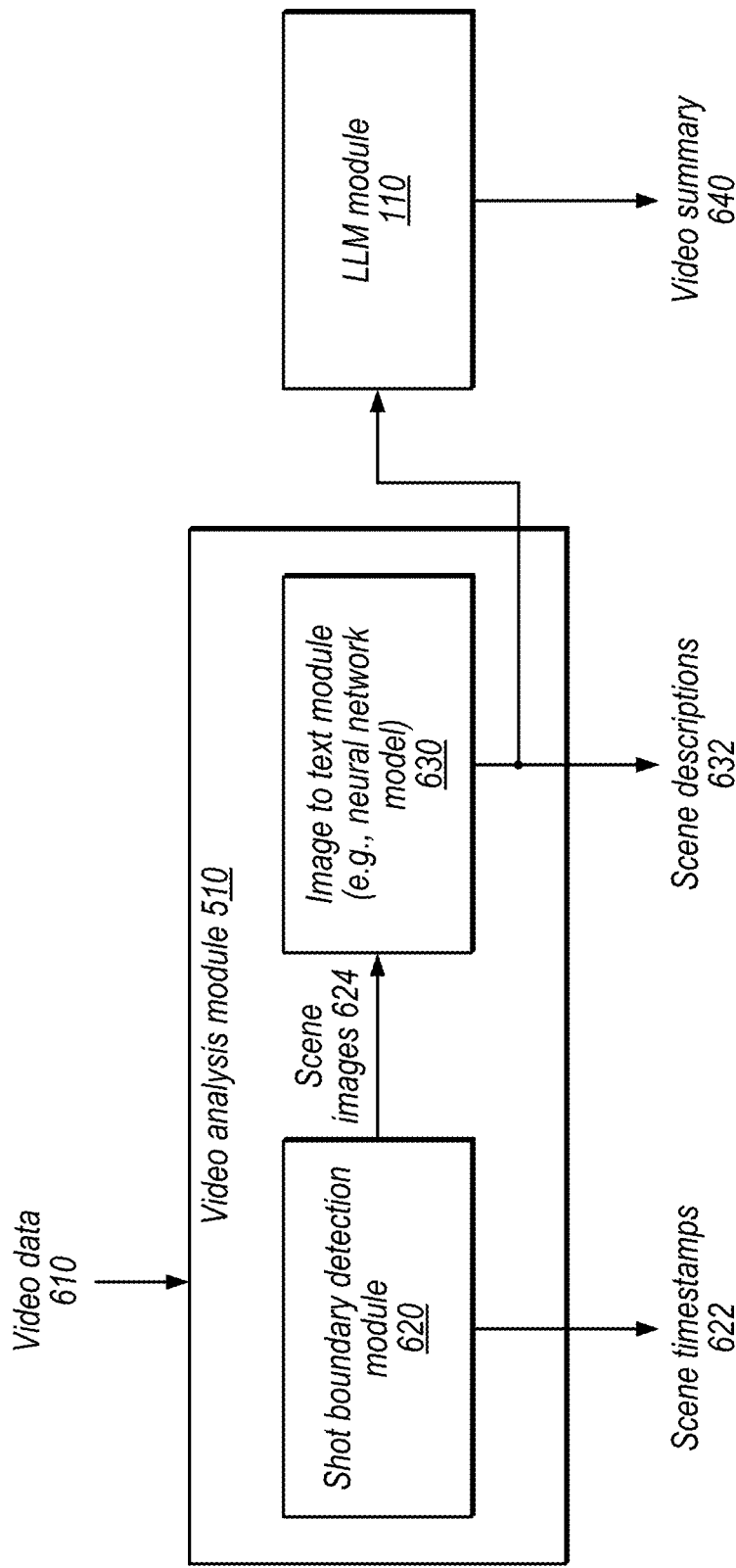
FIG. 6 is a block diagram illustrating an example video analysis module configured to generate scene timestamps and scene descriptions based on video data, according to some embodiments.

FIG. 6 is a block diagram illustrating a detailed example video analysis module 510, according to some embodiments. In the illustrated example, video analysis module 510 includes a shot boundary detection module 620 and an image to text module 630. In the illustrated example, video analysis module 510 receives video data 610 and outputs scene timestamps 622 and scene descriptions 632.

Shot boundary detection module 620, in various embodiments, analyzes video data 610 to detect shot boundaries (e.g., cut transition) and outputs scene timestamps 622 corresponding to the boundaries. For example, shot boundary detection module 620 may detect a boundary by computing a score that represents the differences between two consecutive frames in a video. and further retrieve the timestamp of the two. Shot boundary detection module 620 may use known techniques, such as frame differencing, edge detection, color and texture analysis, etc. In various embodiments, detection module 620 may retrieve one or more scene timestamps 622 that correspond to the detected boundaries from video data 610. In various embodiments, shot boundary detection module 620 may determine one or more scene timestamps 622 based on frames per second (FPS) and the position of the frame in video data 610.

In various embodiments, shot boundary detection module 620 provides one or more scene timestamps 622 to LLM module 110. LLM module 110 or another software module may analyze the scene timestamps 622 to determine a tempo such that the beats line up with shot boundaries, to determine boundaries for musical sections, etc. For example, LLM module 110 may generate LLM adjustments 210 to plan 144 to modify the structure of the song such that a shot boundary corresponds to a transition between a verse and a chorus. Certain such operations may be indicated by rules 150, e.g., a rules that specifies to delineate musical sections based on shot boundary data. In the illustrated example, shot boundary detection module 620 selects one or more frames (e.g., from the middle of each shot) and provides the scene images 624 to image to text module 630.

Image to text module 630, in various embodiments, uses one or more neural networks (e.g., transformer) to generate scene description(s) 632 based on the scene image(s) 624 provided by module 620. For example, a machine learning model, such as BLIP (bootstrapping language-image pre-training), may implement an image transformer to extract features from one or more scene images 624 and a decoder to generate a sequence of text based on the extracted feature vectors. Image to text module 630 may output a textual description per scene image 624. For example, image to text module 630 may output a textual description per segment of video (as defined by the shot boundaries). In various embodiments, image to text module 630 uses positional encoding to process two or more scene images 624 such that it considers the context of previous scenes. For example, image to text module 630 may determine a character in a frame is expressing an emotion (e.g., anger) based on the context of an earlier scene, such as a battle scene. In various embodiments, image to text module 630 processes video data 610 to generate a general video description. Image to text module 630 may process a textual prompt and scene images 624 to generate scene descriptions 632. For example, image to text module 630 may consider the general video description when generating the scene descriptions 632 or vice versa.

In the illustrated example, module 630 provides scene descriptions 632 to LLM module 110, which generates a video summary 640 based on the scene descriptions 632. As discussed above, the various outputs of FIG. 6 may be incorporated into portions of the context 140 (including plan 144) which may update the hybrid interface for subsequent user interaction.

In some embodiments, various video context information may be manually adjusted by the user via traditional interface 122. For example, users may manually adjust scene descriptions or the video summary and LLM module 110 may incorporate these adjustments into future decisions regarding updates to the musical plan.

Generally, the combination of video analysis with shot boundary detection, scene descriptions 632, scene timestamps 622, and overall narrative (e.g., video summary 640) may map well to specific music properties that are represented in plan 144. For example, shot boundary timings may map to tempo, shot contents may map to sections of music, instrumentation for specific imagery or events, etc., and the overall narrative may map to genre selection and sequencing of musical sections. In some embodiments, rules 150 indicate one or more of these mappings to the LLM model. Note that when providing multiple levels of music descriptions to the LLM module 110 (e.g., due to their inclusion in context 140), these mappings may not be independent but rather co-dependent, such that the beat or type of a musical section, for example, is affected by genre and overall narrative, and so on.

In some embodiments, video analysis module 510 provides video data 610 to the system in order to synchronize the rendered musical content from renderer 160 to video data 610. The hybrid interface may display the video with the rendered audio such that the user can interact with the hybrid interface to view and listen to the updated video.

Example Interface Screenshots

FIGS. 7-12 are screenshots illustrating example scenarios in a hybrid interface and video extension, according to some embodiments.

Figure 7:
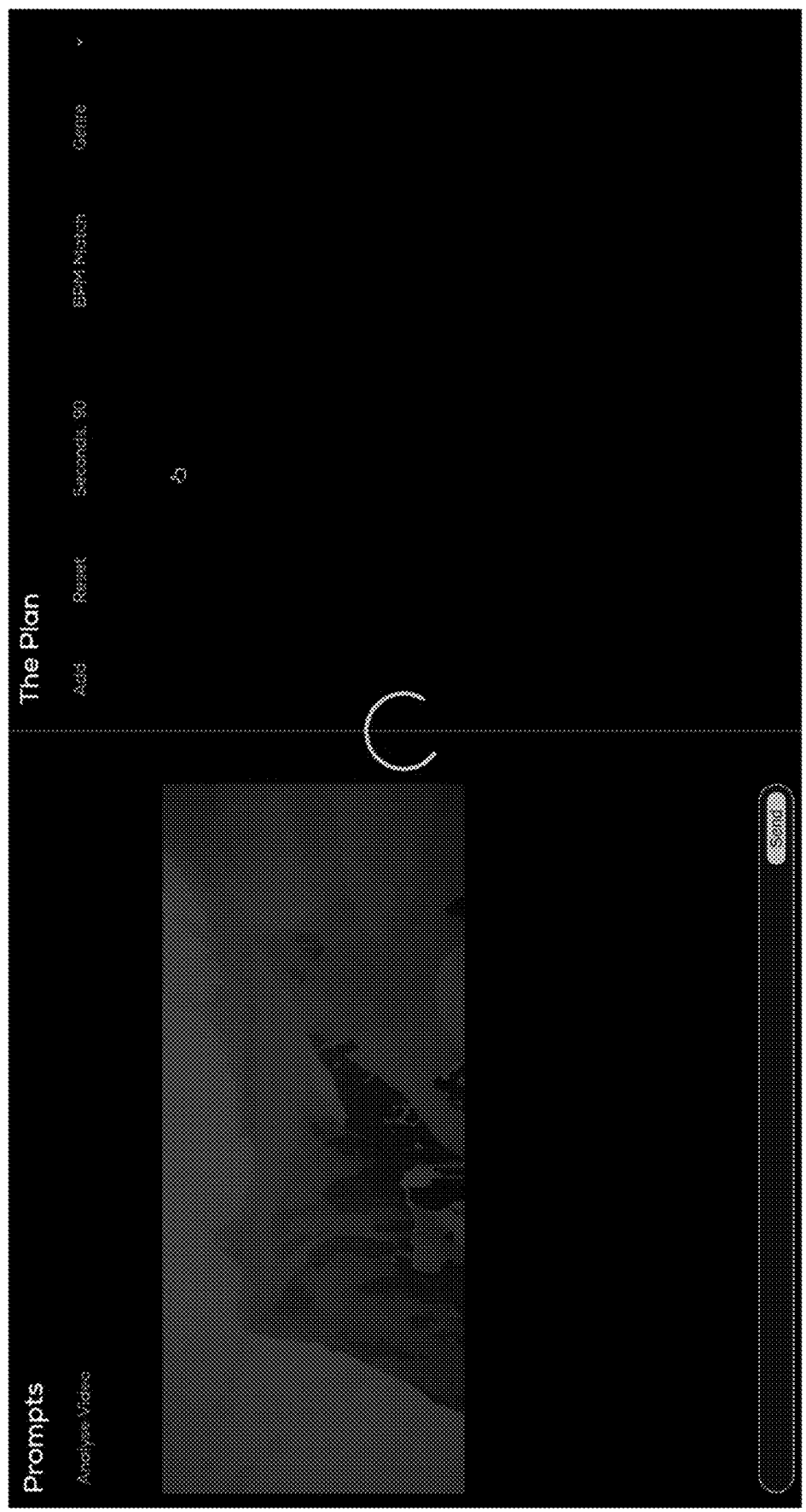

FIG. 7 illustrates an example hybrid interface with initial video analysis, according to some embodiments. In the illustrated example, a video (e.g., video data 610) has been imported into the system and is shown on the left-hand side of the interface (which may also be used for conversational input). The right-hand side of the interface also shows traditional user inputs, e.g., to add a musical section, reset the plan, change the length of the plan, select a genre, etc. Therefore, the initial plan 144 may be automatically generated by the system based on the video or generated based on manual user input.

Figure 8:
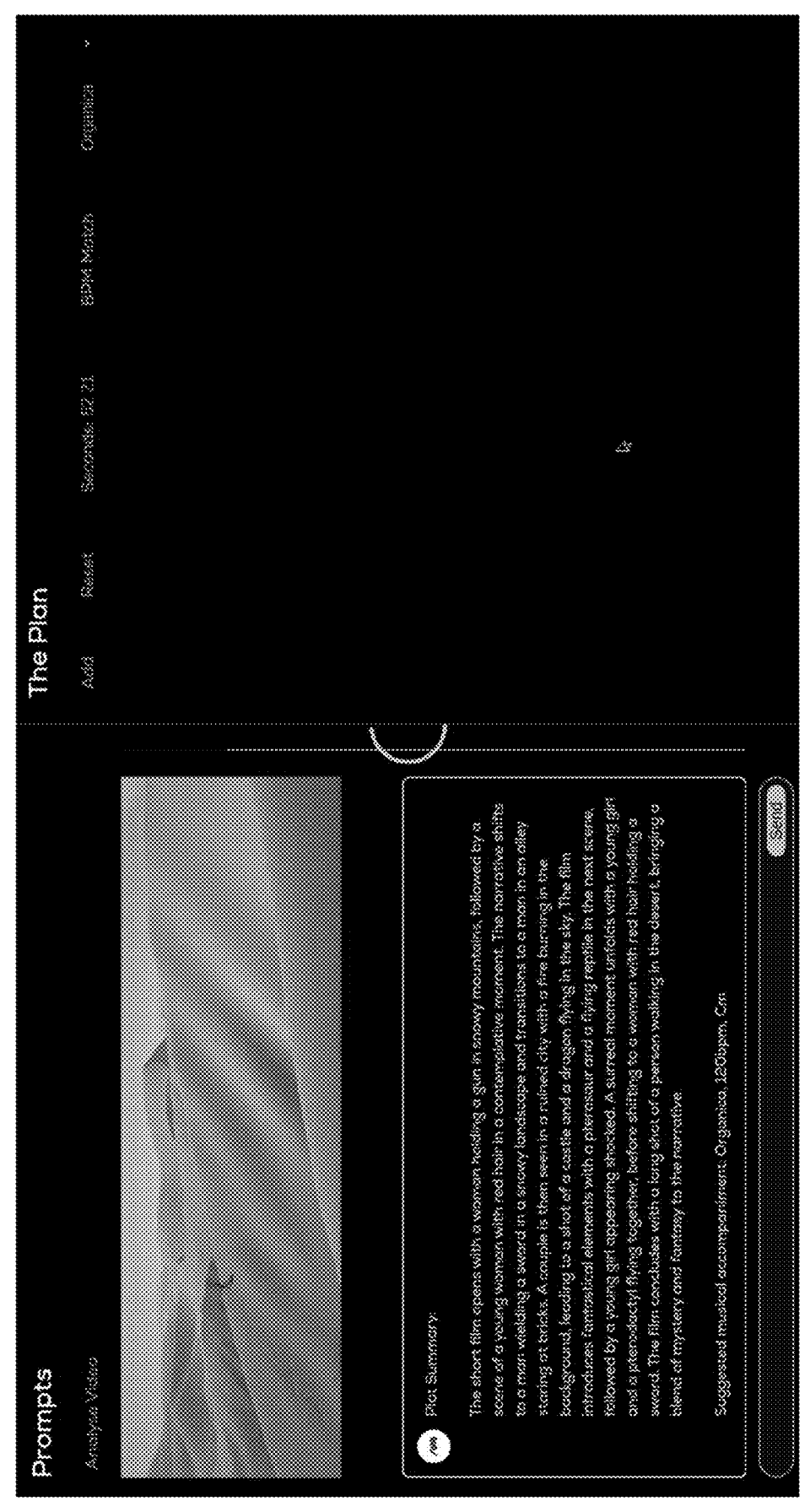

FIG. 8 illustrates an example hybrid interface with a plot summary of the video and suggestions for plan parameters, according to some embodiments. In the illustrated example, LLM module 110 has generated a video summary 640 for the video (e.g., based on the outputs of video analysis module 510 as discussed above). In some embodiments, the video summary 640 initializes the context 140 of LLM module 110.

Figure 9:
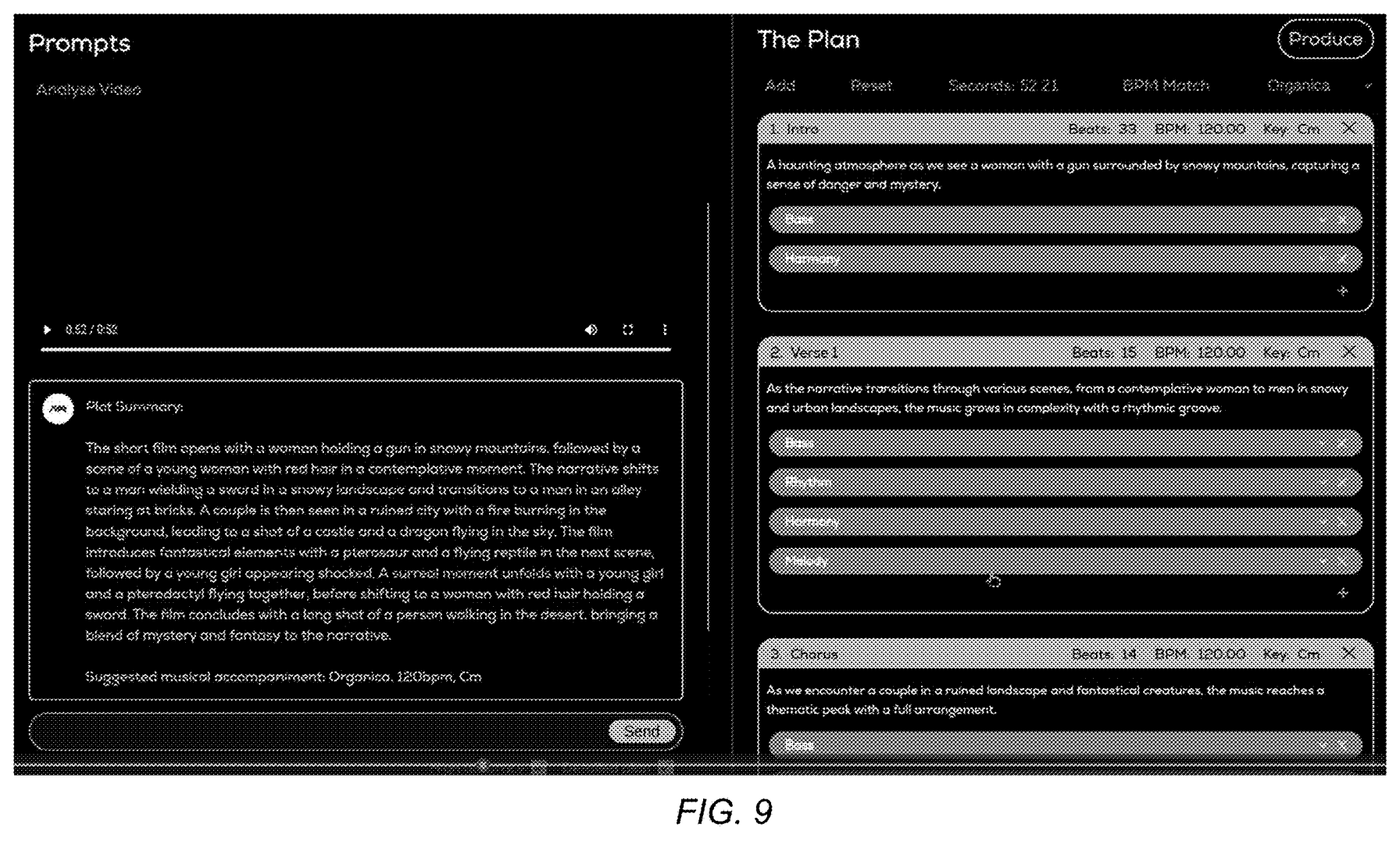

FIG. 9 illustrates an example hybrid interface with an initial plan generated by the LLM module 110, according to some embodiments. In the illustrated example, the plan includes at least intro, verse 1, and chorus sections, each with one or more tracks (e.g., bass, rhythm, harmony, melody, etc.), a number of beats, a tempo in beats per minute, and a key (C minor in this example). As discussed above, a user may adjust the plan using the traditional interface 122 on the right, conversationally via the conversational interface 112 on the left (by typing and selecting the "send" button), or both. In the illustrated example, each section includes a description of the scene (e.g., scene descriptions 632) corresponding to the musical section, e.g., as output by video analysis module 510. This may allow the user to adjust the descriptions, e.g., to refine subsequent decisions by LLM module 110.

Figure 10:
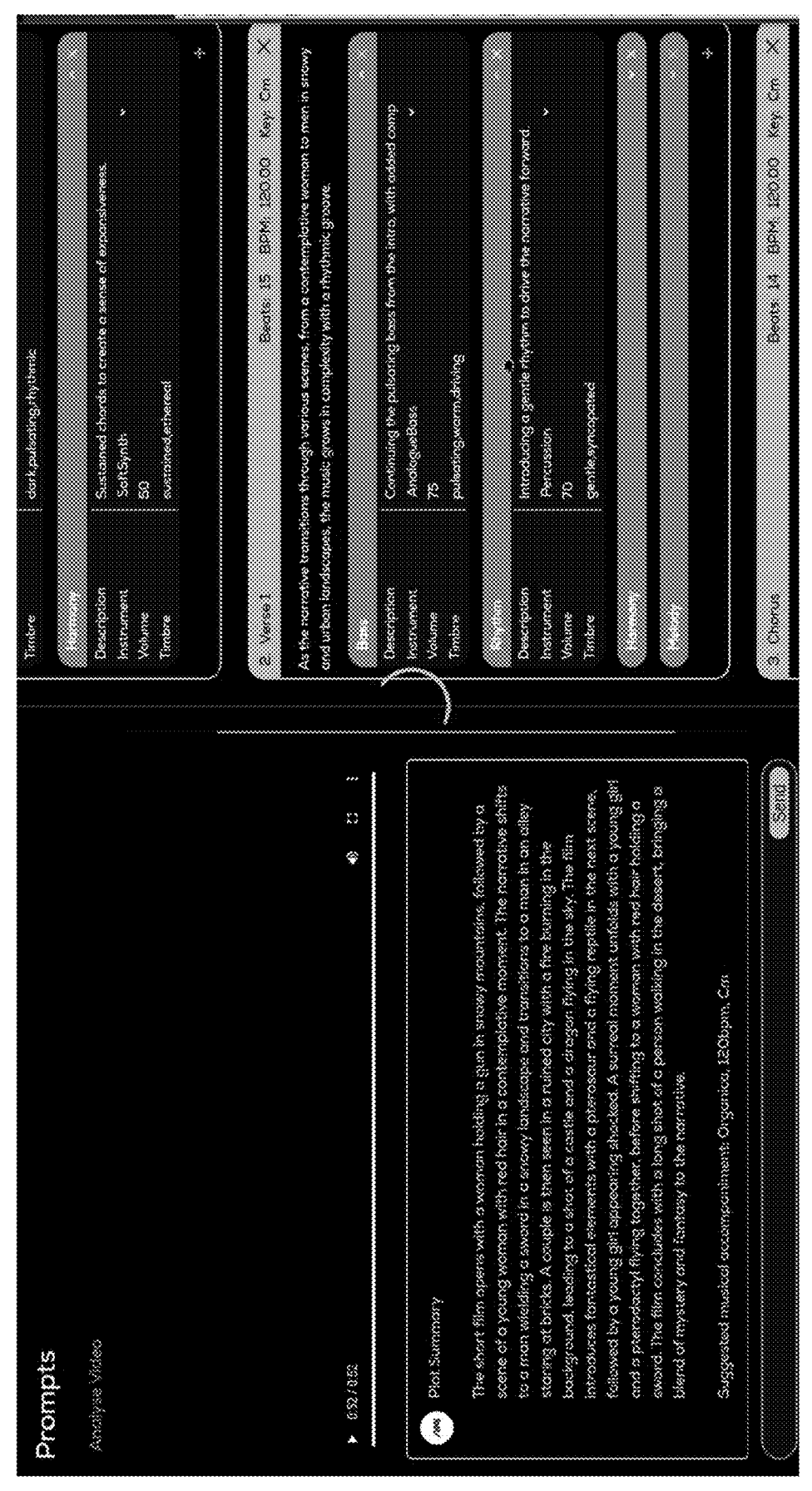

FIG. 10 illustrates an example hybrid interface with expanded details of the initial plan 144 generated by the LLM module 110, according to some embodiments. In this example, each track has description, instrument, volume, and timbre data, at least some of which may be manually adjusted by the user or adjusted (or have adjustments suggested) based on conversation with a user by LLM module 110.

Figure 11:
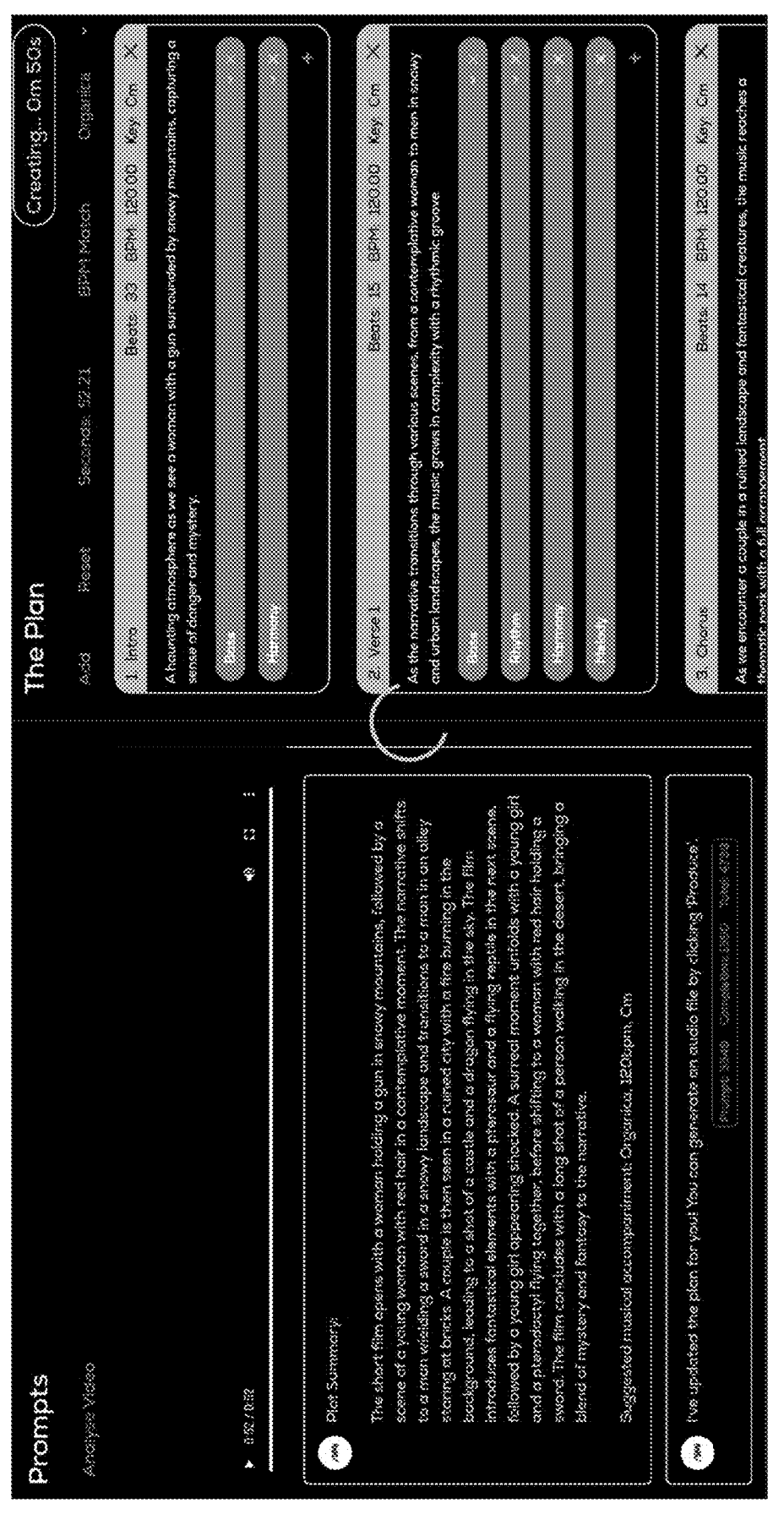

FIG. 11 illustrates an example hybrid interface with a conversational response based on a plan update, according to some embodiments. As shown, this example includes a conversational prompt "I've updated the plan for you! You can generate an audio file by clicking 'Produce.'" In this example, the user has already selected the "Produce" input and the upper right hand of the interface shows that the musical composition is being created. Note that the illustrated update to the plan 144 could be based on a user conversational request, manual user changes to plan, or both.

Figure 12:

FIG. 12 illustrates an example hybrid interface with playback of the video using music composed based on the plan 144, according to some embodiments. In this example, the conversational interface 112 allows the user to play the video with the music that was generated based on the plan 144. This may allow the user to evaluate the composition (and further iterate and update the plan 144 to re-send to the renderer if desired).

Example Method

Figure 13:
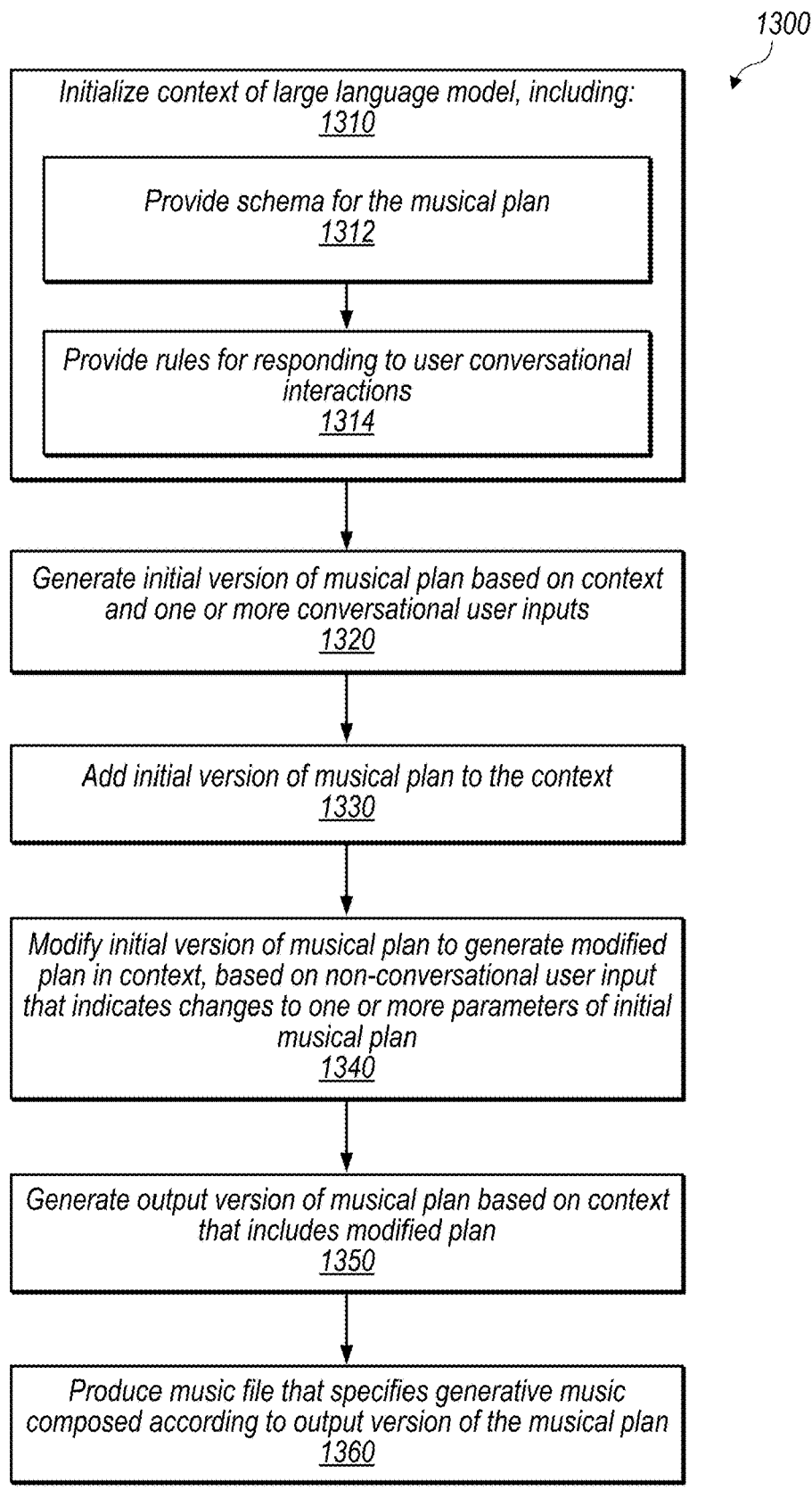
FIG. 13 is a flow diagram illustrating an example method, according to some embodiments.

FIG. 13 is a flow diagram illustrating an example method 1300 performed by a computer system to generate a musical plan (e.g., plan 144) based on both conversational inputs (e.g., via conversational interface 112) and traditional user interface inputs (e.g., via traditional interface 122), according to some embodiments. The method shown in FIG. 13 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1310, in the illustrated embodiment, the computer system initializes the context (e.g., LLM context 140) of a large language model (e.g., LLM module 110). In the illustrated example, this includes elements 1312 and 1314.

At 1312, in the illustrated embodiment, the computer system provides a schema (e.g., plan schema 130) for the musical plan.

At 1314, in the illustrated embodiment, the computer system provides rules (e.g., rules 150) for responding to user conversational interactions, including one or more rules that instruct the model to generate the musical plan according to the schema based on at least one category (e.g., plan or conversational output 316) of user conversational input. In various embodiments, the rules further include one or more rules that instruct the large language model to generate the output version of the musical plan based on at least one category of user conversational input. In various embodiments, the rules further include one or more rules that instruct the large language model to act in one or more roles when interacting with the user.

At 1320, in the illustrated embodiment, the computer system generates an initial version of the musical plan based on the context and one or more conversational user inputs.

At 1330, in the illustrated embodiment, the computer system adds the initial version of the musical plan to the context.

At 1340, in the illustrated embodiment, the computer system modifies the initial version of the musical plan to generate a modified plan in the context, based on non-conversational user input that indicates changes to one or more parameters of the initial musical plan. The non-conversational user input may include input via one or more of user interface elements, such as text entry field, button, slider, and dropdown. The non-conversational user input that indicates changes to the one or more parameters (e.g., adjustments 220) may cause the modifying to include two of more of adding a musical section, adding a track to a musical section, changing a beat parameter, changing a key, changing a musical timbre, and changing a text description of a musical section. In various embodiments, the computer system maintains the modified plan in the context.

At 1350, in the illustrated embodiment, the computer system generates an output version of the musical plan based on the context that includes the modified plan.

At 1360, in the illustrated embodiment, the computer system produces a music file that specifies generative music composed according to the output version of the musical plan. The producing may include selecting multiple musical phrases (e.g., loops or tracks) according to parameters in the output version of the musical plan and combining the musical phrases such that at least some of the musical phrases overlap in time in the music file. The computer system may cause audio output equipment to play music according to the music file.

In various embodiments, the computer system (e.g., video analysis module 510) analyzes video data (e.g., video data 610). In various embodiments, initializing the context of the large language model includes adding video-based context (e.g., video-based context 520) based on the analyzing. Analyzing may include determining shot boundary timestamps (e.g., scene timestamps 622). The computer system may determine one or more frames of image data (e.g., scene images 624) for a given shot based on the shot boundary timestamps. The computer system may generate text descriptions (e.g., scene descriptions 632) of one or more frames of image data using an image to text neural network model (e.g., image to text module 630). The video-based context may include the text descriptions and the shot boundary timestamps. The analyzing may further include generating a summary (e.g., video summary 640) of the video based on the text descriptions, using the large language model, and the video-based context includes the summary. The computer system may modify the text descriptions in the video-based context based on non-conversational user input. The rules may further include one or more rules that instruct the large language model to align musical sections with shot boundary timestamps and one or more rules that instruct the large language model to generate attributes for musical sections based on corresponding scene descriptions.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

The invention claimed is:

1. A method, comprising:
a computing system generating a musical plan, including:
initializing a context of a large language model, including:
providing a text-based schema for the musical plan;
providing rules for responding to user conversational interactions, including one or more rules that instruct the model to generate the musical plan according to the schema based on at least one category of user conversational input;
generating, by the large language model, an initial version of the musical plan based on the context and one or more conversational user inputs;
adding the initial version of the musical plan to the context;
modifying the initial version of the musical plan to generate a modified plan in the context, based on non-conversational user input that indicates changes to one or more parameters of the initial version of the musical plan;
generating, by the large language model, an output version of the musical plan based on the context that includes the modified plan; and
producing, by the computing system, a music file that specifies generative music composed according to the output version of the musical plan.

2. The method of claim 1, wherein the rules further include one or more rules that instruct the large language model to generate the output version of the musical plan based on at least one category of user conversational input.

3. The method of claim 1, wherein the rules further include one or more rules that instruct the large language model to act in one or more roles when interacting with the user.

4. The method of claim 1, wherein the non-conversational user input includes input via one or more of the following user interface elements:
text entry field;
button;
slider; and
dropdown.

5. The method of claim 1, wherein the non-conversational user input that indicates changes to the one or more parameters causes the modifying to include two of more of:
adding a musical section;
adding a track to a musical section;
changing a beat parameter;
changing a key;
changing a musical timbre; and
changing a text description of a musical section.

6. The method of claim 1, further comprising:
maintaining the initial version of the musical plan in the context.

7. The method of claim 1, wherein the producing includes:
selecting multiple musical phrases according to parameters in the output version of the musical plan; and
combining the musical phrases such that at least some of the musical phrases overlap in time in the music file.

8. The method of claim 1, further comprising:
causing, by the computing system, audio output equipment to play music according to the music file.

9. The method of claim 1, further comprising:
analyzing, by the computing system, video data;
wherein the initializing the context of the large language model includes adding video-based context based on the analyzing.

10. The method of claim 9, wherein:
the analyzing includes:
determining shot boundary timestamps;
determining one or more frames of image data for a given shot, based on the shot boundary timestamps; and
generating text descriptions of the one or more frames of image data using an image to text neural network model; and
the video-based context includes the text descriptions and the shot boundary timestamps.

11. The method of claim 10, wherein:
the analyzing further includes generating a summary of the video data based on the text descriptions, using the large language model; and
the video-based context includes the summary.

12. The method of claim 10, further comprising:
modifying the text descriptions in the video-based context based on non-conversational user input.

13. The method of claim 10, wherein the rules further include:
one or more rules that instruct the large language model to align musical sections with shot boundary timestamps; and
one or more rules that instruct the large language model to generate attributes for musical sections based on corresponding scene descriptions.

14. A non-transitory computer-readable medium having instructions stored thereon that are executable by a computing system to perform operations comprising:
- generating a musical plan, including:
  - initializing a context of a large language model, including:
    - providing a text-based schema for the musical plan;
    - providing rules for responding to user conversational interactions, including one or more rules that instruct the model to generate the musical plan according to the schema based on at least one category of user conversational input;
  - generating, by the large language model, an initial version of the musical plan based on the context and one or more conversational user inputs;
  - adding the initial version of the musical plan to the context;
  - modifying the initial version of the musical plan to generate a modified plan in the context, based on non-conversational user input that indicates changes to one or more parameters of the initial version of the musical plan;
  - generating, by the large language model, an output version of the musical plan based on the context that includes the modified plan; and
- producing a music file that specifies generative music composed according to the output version of the musical plan.

15. The non-transitory computer-readable medium of claim 14, wherein the rules further include one or more rules that instruct the large language model to generate the output version of the musical plan based on at least one category of user conversational input.

16. The non-transitory computer-readable medium of claim 14, wherein the rules further include one or more rules that instruct the large language model to act in one or more roles when interacting with the user.

17. The non-transitory computer-readable medium of claim 14, further comprising:
- analyzing video data;
- wherein the initializing the context of the large language model includes adding video-based context based on the analyzing.

18. The non-transitory computer-readable medium of claim 17, wherein:
- the analyzing includes:
  - determining shot boundary timestamps;
  - determining one or more frames of image data for a given shot, based on the shot boundary timestamps; and
  - generating text descriptions of the one or more frames of image data using an image to text neural network model; and
- the video-based context includes the text descriptions and the shot boundary timestamps.

19. The non-transitory computer-readable medium of claim 18, wherein:
- the analyzing further includes generating a summary of the video data based on the text descriptions, using the large language model; and
- the video-based context includes the summary.

20. A system, comprising:
- one or more processors; and
- one or more memories having program instructions stored thereon that are executable by the one or more processors to:
- generate a musical plan, including to:
  - initialize a context of a large language model, including to:
    - provide a text-based schema for the musical plan;
    - provide rules for responding to user conversational interactions, including one or more rules that instruct the model to generate the musical plan according to the schema based on at least one category of user conversational input;
  - generate, by the large language model, an initial version of the musical plan based on the context and one or more conversational user inputs;
  - add the initial version of the musical plan to the context;
  - modify the initial version of the musical plan to generate a modified plan in the context, based on non-conversational user input that indicates changes to one or more parameters of the initial version of the musical plan;
  - generate, by the large language model, an output version of the musical plan based on the context that includes the modified plan; and
- produce a music file that specifies generative music composed according to the output version of the musical plan.

* * * * *